US011858790B2

(12) United States Patent
Lenart

(10) Patent No.: US 11,858,790 B2
(45) Date of Patent: Jan. 2, 2024

(54) PRY BAR ASSEMBLY

(71) Applicant: Edward Lenart, Farmington Hills, MI (US)

(72) Inventor: Edward Lenart, Farmington Hills, MI (US)

(73) Assignee: NCH Corporation, Irving, TX (US)

( * ) Notice: Subject to any disclaimer, the term of this patent is extended or adjusted under 35 U.S.C. 154(b) by 0 days.

(21) Appl. No.: 17/335,425

(22) Filed: Jun. 1, 2021

(65) Prior Publication Data

US 2021/0284511 A1 Sep. 16, 2021

Related U.S. Application Data

(63) Continuation of application No. 16/122,193, filed on Sep. 5, 2018, now Pat. No. 11,021,355.

(51) Int. Cl.
*B66F 15/00* (2006.01)
*B25C 11/00* (2006.01)

(52) U.S. Cl.
CPC .............. *B66F 15/00* (2013.01); *B25C 11/00* (2013.01)

(58) Field of Classification Search
CPC . B25C 11/00; B25F 1/00; B66F 15/00; E04G 23/08; B25B 31/00; B25B 27/00
See application file for complete search history.

(56) References Cited

U.S. PATENT DOCUMENTS

| | | | | |
|---|---|---|---|---|
| 3,134,574 | A | 5/1964 | Reuterfors | |
| 4,335,509 | A * | 6/1982 | Smith | B26B 21/28 30/340 |
| 4,536,910 | A | 8/1985 | Clark | |
| 6,948,700 | B2 * | 9/2005 | Wood | B66F 15/00 254/21 |
| 8,365,378 | B1 * | 2/2013 | Lenart | B25C 11/00 15/50.1 |
| 8,646,138 | B2 | 2/2014 | Allen et al. | |
| 8,955,827 | B2 * | 2/2015 | Brown | B25C 11/00 254/21 |
| D830,144 | S * | 10/2018 | Chiu | D8/48 |
| 2005/0062026 | A1 | 3/2005 | Holcomb | |
| 2010/0115705 | A1 | 5/2010 | Allen et al. | |
| 2013/0263382 | A1 | 10/2013 | Sindt et al. | |
| 2017/0107089 | A1 | 4/2017 | Lenart | |

* cited by examiner

*Primary Examiner* — Seahee Hong
(74) *Attorney, Agent, or Firm* — Scheef & Stone, LLP; Robin L. Barnes

(57) ABSTRACT

A pry bar assembly includes a plate that is elongated and has a first end, a second end, a first lateral edge, a second lateral edge, an upper surface and a lower surface. The plate includes a claw section, a chisel section and a middle section positioned therebetween. The claw section includes the first end and a rounded heel. The claw section includes a first portion and a second portion. The first portion is attached to the middle section and curves upwardly and away from the middle section in a semi-cylindrical shape to form the rounded heel. The second portion extends downwardly from the first portion. The chisel section is angled upwardly from the middle section. The upper surface has an elongated crest therein that is spaced from the first and second lateral edges and extends along a length of the middle section and into the chisel section.

27 Claims, 4 Drawing Sheets

PRY BAR ASSEMBLY

CROSS-REFERENCE TO RELATED APPLICATIONS

Not applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to tools utilized for removing framing, wall structures, decking and the like and more particularly pertains to a construction wrecking tool for assisting a person in pulling apart structures typically held together by nails and other like fasteners.

BRIEF SUMMARY OF THE INVENTION

An embodiment of the disclosure meets the needs presented above by generally comprising a plate that is elongated and has a first end, a second end, a first lateral edge, a second lateral edge, an upper surface and a lower surface. The plate includes a claw section, a chisel section and a middle section positioned between the claw and chisel sections. The claw section includes the first end and the chisel section includes the second end and a rounded heel. The claw section includes a first portion and a second portion. The first portion is attached to the middle section and curves upwardly and away from the middle section in a semi-cylindrical shape to form the rounded heel. The second portion extends downwardly from the first portion. The chisel section is angled upwardly from the middle section. The upper surface has an elongated crest therein that is spaced from the first and second lateral edges and extends along a length of the middle section and into the chisel section.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
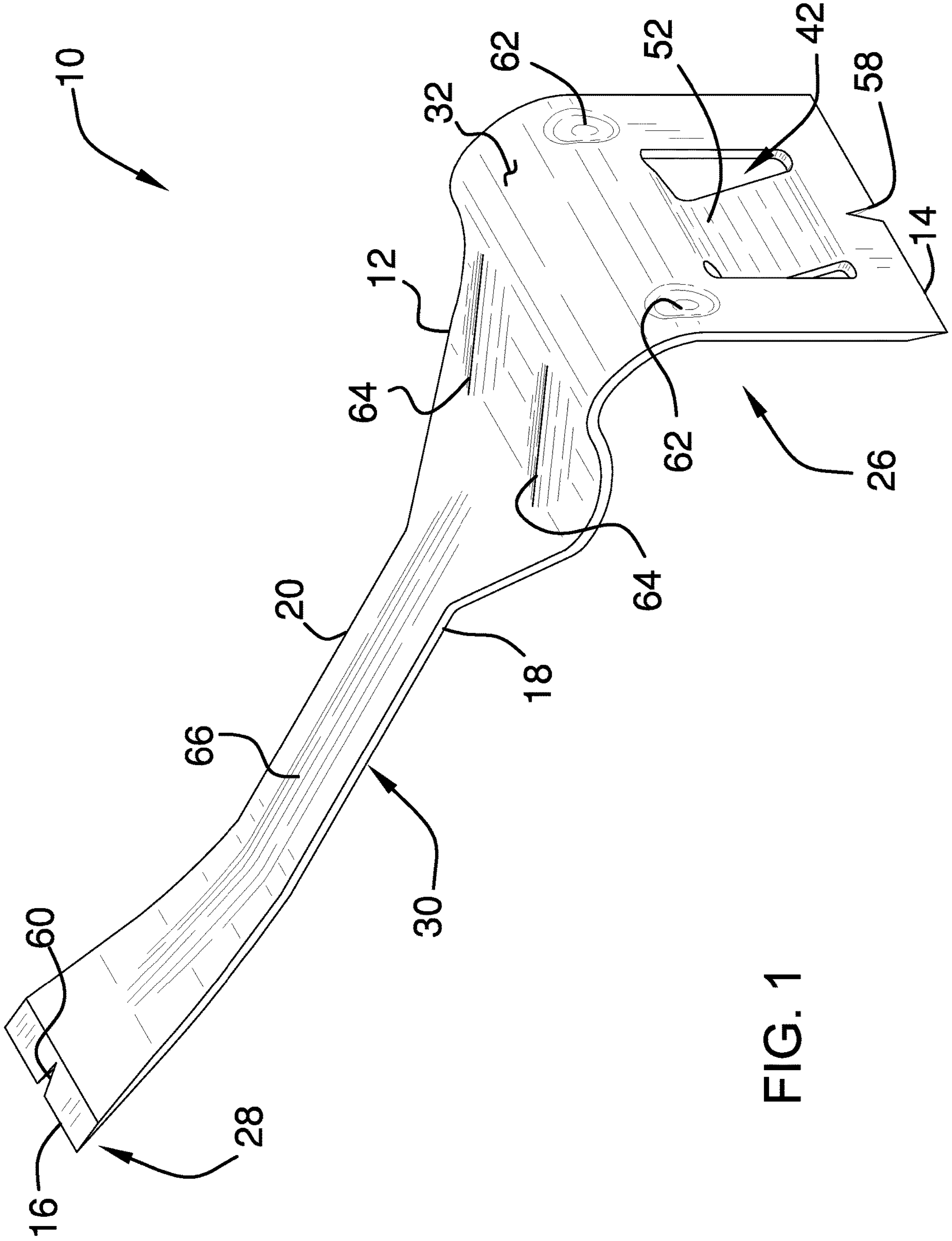
FIG. 1 is a top perspective view of a pry bar assembly according to an embodiment of the disclosure.

With reference now to the drawings, and in particular to FIGS. 1 through 6 thereof, a new structure deconstruction device embodying the principles and concepts of an embodiment of the disclosure and generally designated by the reference numeral 10 will be described.

As best illustrated in FIGS. 1 through 6, the pry bar assembly 10 generally comprises a plate 12 that is elongated and has a first end 14, a second end 16, a first lateral edge 18, a second lateral edge 20, an upper surface 22 and a lower surface 24. It should be understood that the terms such "upper" and "lower" are being utilized to facilitate clarity when describing the assembly 10 but as the assembly 10 may be used in any direction or orientation these terms should not be considered either definitive or static. The plate 12 extends laterally generally between 10.0 inches and 24.0 inches, though the plate 12 is longer along its surface due to bends positioned therein. Also, while this would be a typical length, a length greater than thus, such as up 36.0 inches may be feasible. The plate 12 includes a claw section 26, a chisel section 28 and a middle section 30 positioned between the claw 26 and chisel 28 sections. As can be seen in the Figures, the middle section 30 may comprise the narrowest portion of the plate 12 wherein the first 18 and second 20 lateral edges diverge from each other as they extend from the middle section 30 to either of the first 14 or second 16 ends. The first end 14 has a width typically between 3.5 inches and 5.0 inches and the second end 16 typically has a width between 2.0 inches and 3.0 inches though other sizes may be useful depending upon usage. The middle section 30 may have a width between 1.0 inch and 2.0 inches from the first lateral edge 18 to the second lateral edge 20.

The claw section (or second section) 26 includes the first end 14 and the chisel section (or third section) 28 includes the section end 16. Moreover, as may typically be found on a pry bar, the claw section 26 may include a rounded heel 32.

The middle section (or first section) 30 may be substantially straight from the chisel section 28 to the claw section 26 such that the first 18 and second 20 lateral edges of the middle section 30 lie in a shared horizontal plane.

Figure 3:
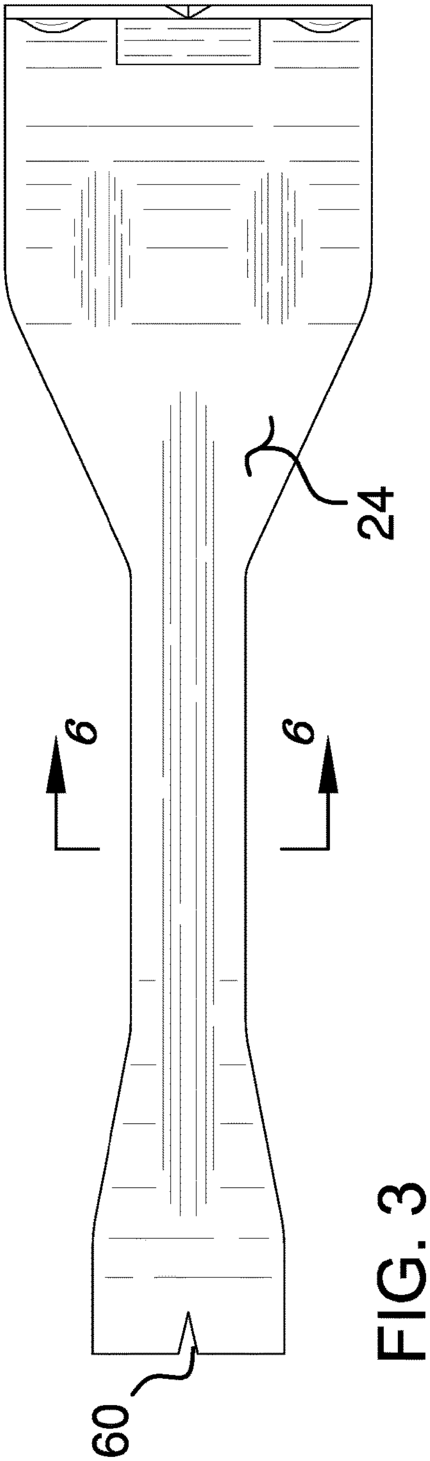
FIG. 3 is a bottom view of an embodiment of the disclosure.

The claw section 26 includes a second claw portion 34 and a first claw portion 36. The second claw portion 34 is attached to the middle section 30 and curves upwardly and away from the middle section 30 in a semi-cylindrical shape to form the rounded heel 32. The first claw portion 36 extends downwardly from the second claw portion 34 such that the shared horizontal plane 38 of the middle section 30 intersects the first claw portion 36. The first claw portion 36 lies in a plane 40 oriented perpendicular to the shared horizontal plane 38. FIG. 3 depicts these planes 38, 40 from a side view.

The first claw portion 36 of the claw section (or second section) 26 has an aperture 42 extending therethrough. The aperture 42 has an upper edge 44, a lower edge 46, a first side edge 48 and a second side edge 50. A pry panel 52 is integrally attached to and extends between the upper 44 and lower 46 edges. The pry panel 52 is bowed inwardly toward the second end 16. More particularly, the pry panel 52 may form a triangle wherein the pray panel 52 forms two legs and the third leg is a plane of the aperture 42. The pry panel 52 includes a short leg 54 and a long leg 56 where the short leg 54 is positioned nearer to the second claw portion 34. The long leg 56 may form an angle with a plane of the aperture 42 between 20° and 25° while the short leg 54 may form an angle with the plane of the aperture 42 between 40° and 50°. The aperture is generally rectangular shaped and may have a length and a width each between 2.0 inches and 4.0 inches.

The chisel section (or third section) 28 is angled upwardly from the middle section 30. More specifically, the chisel section 28, from the middle section 30 to the second end 16, is angled upwardly to form an angle 56 between about 20° and 30° with respect to the shared plane 38. This will provide more leverage when the chisel section 28 is used to remove fasteners or is to be extended between two structural components typically held together by nails, screws and the like.

The first end 14 is tapered to a sharpened edge wherein the lower surface 24 adjacent to the first end 14 is angled toward the upper surface 22. A notch 58 extends into the first end 14 and is positioned between the first 18 and second 20 lateral edges. The second end 16 is tapered to a sharpened edge wherein the upper surface 22 adjacent to the second end 16 is angled toward the lower surface 24. A notch 60 extends into the second end 16 and is positioned between the first 18 and second 20 lateral edges. The notch 58 in the first end 14 and the notch 60 in the second end 16 are each V-shaped and form angles between 15° and 25°. Each of the first 14 and second 16 ends forms an angle being between about 15° and 25°.

Figure 2:
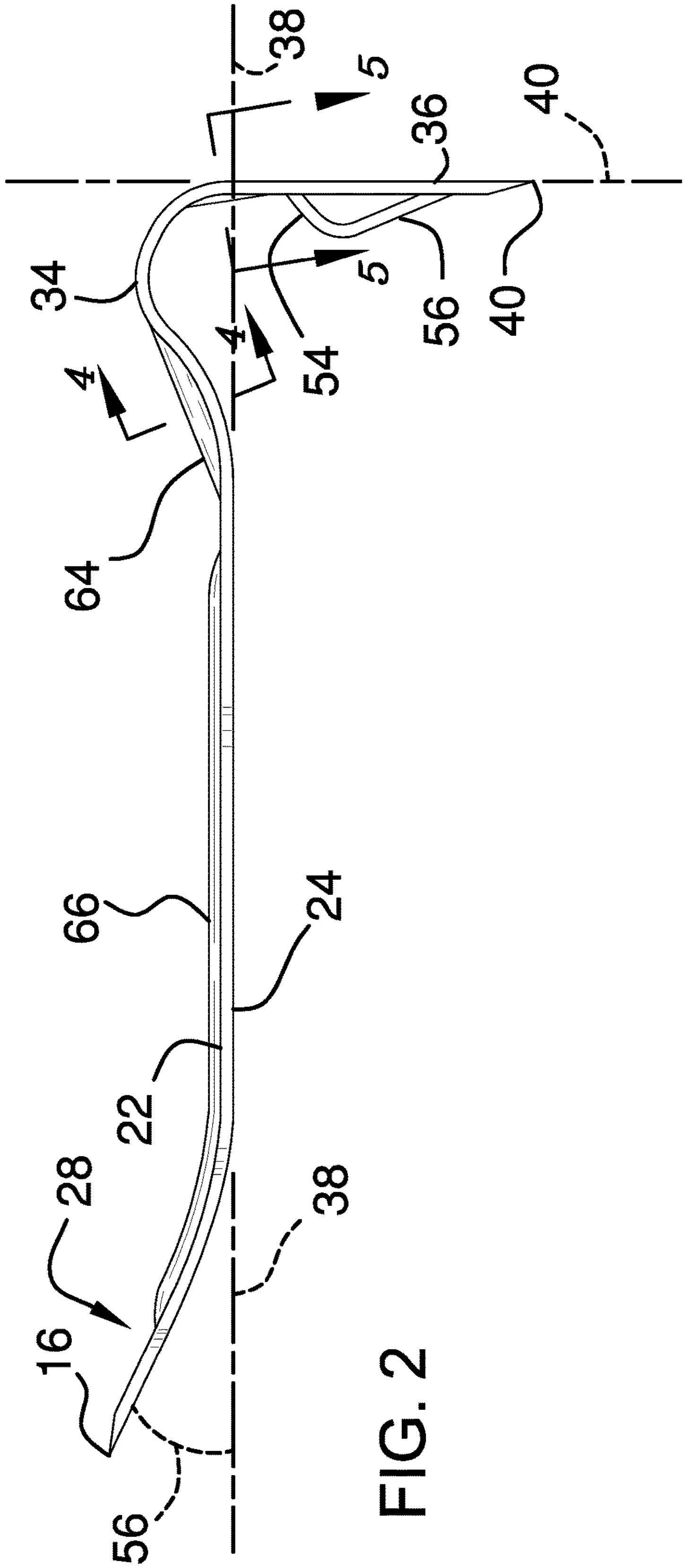
FIG. 2 is a side view of an embodiment of the disclosure.
Figure 4:
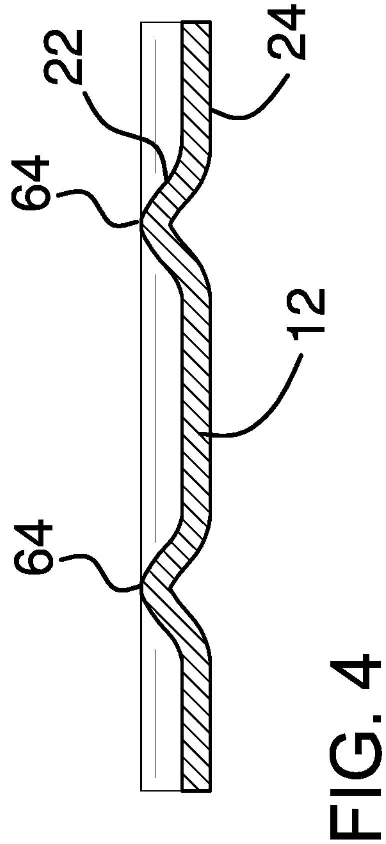
FIG. 4 is a cross-sectional view of an embodiment of the disclosure taken along line 4-4 of FIG. 2.
Figure 5:
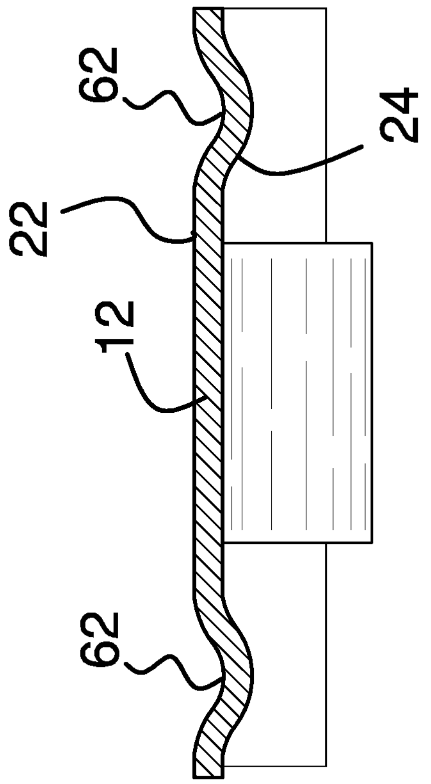
FIG. 5 is a cross-sectional view of an embodiment of the disclosure taken along line 5-5 of FIG. 2.
Figure 6:
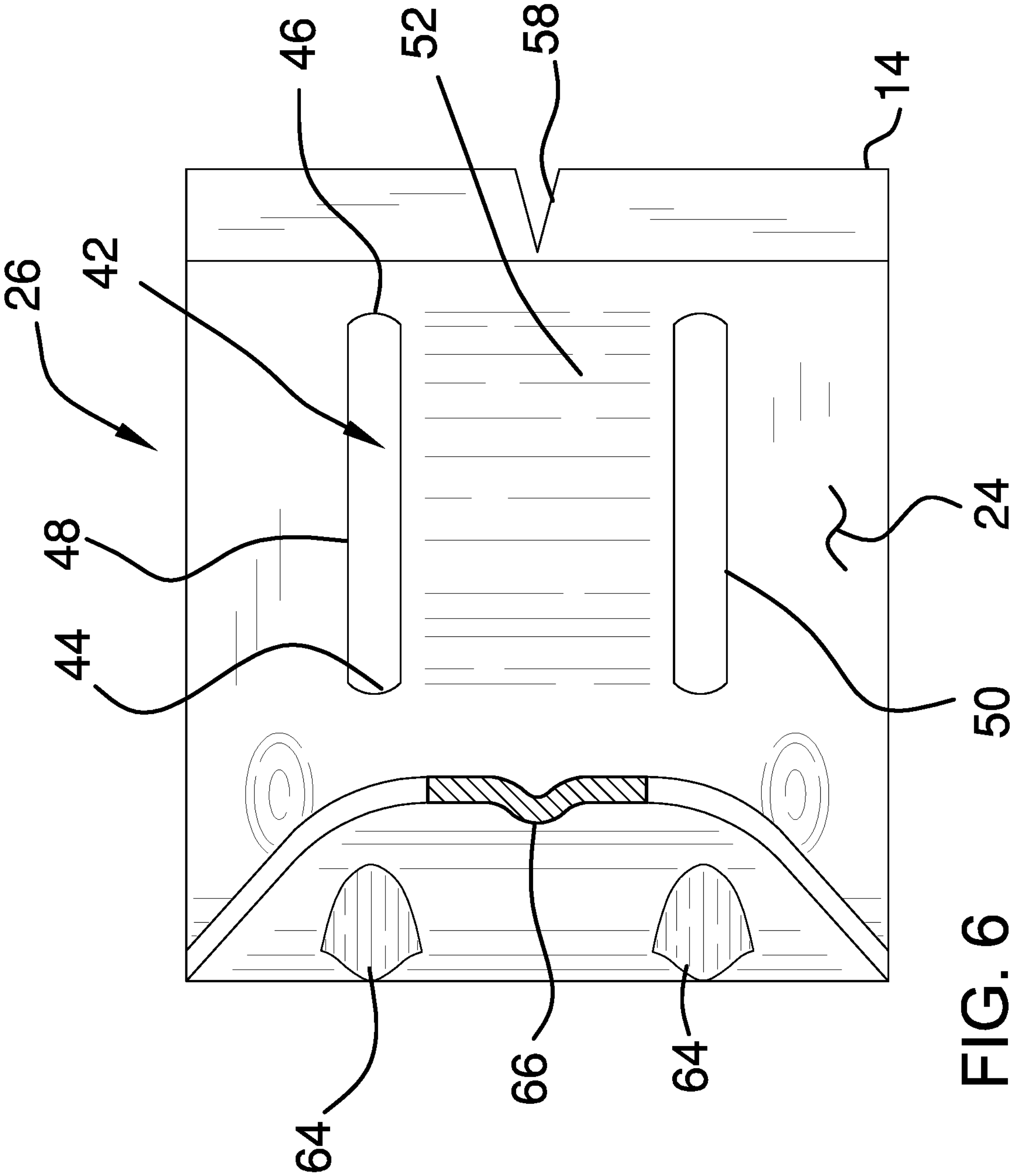
FIG. 6 is a cross-sectional view of an embodiment of the disclosure taken along line 6-6 of FIG. 3.

The claw section 26 has a pair of indentations 62 therein extending into the upper surface 22 which causes bowing outwardly of corresponding areas in the lower surface 24. The indentations 62 are laterally spaced from each other. The indentations are positioned 62 in the second portion 36, opposite the first edge 14 and adjacent to the heel 32. The upper surface 22 of the claw section 26 includes a pair of ridges 64 that are laterally spaced from each other and are positioned in the second claw portion 34. The ridges 64 cause corresponding depressions on the lower surface as can be seen in FIG. 4. The upper surface 22 has an elongated crest 66 therein. As can be seen in FIGS. 1 and 2, the crest 66 is spaced from the first 19 and second lateral 20 edges and the crest 66 extends along a length of the middle section 30 and into the chisel section 28. FIG. 3 depicts an elongated channel corresponding to the crest 66. The crest 66, ridges 64, and depressions 62 each strengthen the plate 12 to prevent its bending along these points when force is placed on the first end 14, second end 16, or heel 32. The crest 66, ridges 64 and depressions 62 each have curved lower 24 and upper 22 surfaces to further add rigidity to the plate 12.

In use, the pry bar assembly 10 is used in a conventional manner for removing fasteners, such as nails, and for pulling apart structural components and thus act as a "wrecking" tool for deconstruction purposes. However, the unique shape of the assembly 10 provides for greater strength as the plate 12 will not easily bend while being used. This allows the assembly 10 to be more light weight and have a thickness of less than 0.17 inches.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pry bar comprising:

a first section having a longitudinal axis in a first plane;

a second section comprising a first claw portion;

wherein the first claw portion comprises a first plate having a first lateral edge and a second lateral edge, each lateral edge disposed in a second plane substantially perpendicular to the first plane, and a single pry panel extending from the first plate toward the first section; and wherein the single pry panel comprises a first leg and a second leg, wherein the first leg is longer than the second leg, and wherein each leg has a first end and a second end, wherein the first end of the first leg is connected to the first plate, wherein the second end of the second leg is connected to the first plate, and wherein the second end of the first leg is connected to the first end of the second leg.

2. The pry bar according to claim 1 wherein the first leg forms an angle relative to the second plane of around 20-25 degrees and the second leg forms an angle relative to the second plane of around 40-50 degrees.

3. The pry bar according to claim 1 further comprising a v-shaped notch in a distal end and wherein the single pry panel is substantially centered above the v-shaped notch.

4. The pry bar according to claim 1 wherein one of the first leg or the second leg forms an angle relative to the second plane of 40-50 degrees.

5. The pry bar according to claim 1 further comprising a third section, wherein the third section comprises a chisel portion;

wherein the first section comprises a middle portion disposed between the chisel portion and the first claw portion;

wherein the second section further comprises a second claw portion disposed between the first section and the first claw portion; and wherein the chisel portion and at least part of the second claw portion extend away from the middle portion in a first direction relative to the first plane.

6. The pry bar according to claim 5 wherein the chisel portion is angled away from the first claw portion and forms an angle relative to the first plane of around 20-30 degrees.

7. The pry bar according to claim 1 wherein the first leg and the second leg are integrally formed with the first plate.

8. The pry bar according to claim 1 wherein the second section further comprises a second claw portion disposed between the first section and the first claw portion and wherein the second claw portion comprises at least one ridge.

9. The pry bar according to claim 8 wherein the second section further comprises a rounded heel disposed between the first claw portion and the second claw portion.

10. The pry bar according to claim 1 wherein the first claw portion comprises a sharpened edge at a distal end.

11. The pry bar according to claim 10 wherein the first claw portion further comprises a v-shaped notch in the distal end.

12. The pry bar according to claim 1 wherein the first claw portion comprises a first surface disposed toward the first section, a second surface disposed away from the first section, and a distal edge disposed between the first lateral edge and the second lateral edge;

wherein the first surface is tapered near the distal edge to form an angle of 15-25 degrees relative to the second surface.

13. The pry bar according to claim 12 wherein the first claw portion further comprises a notch in the distal edge.

14. The pry bar according to claim 1 wherein the first plate comprises two apertures and the single pry panel is disposed between the two apertures.

15. The pry bar according to claim 1 wherein the second section further comprises a second claw portion comprising a second plate disposed between the first section and the first claw portion;

wherein the second plate has a first width near the first section that is narrower than a second width near the first claw portion.

16. The pry bar according to claim 15 wherein the first claw portion and the second claw portion are integrally formed.

17. The pry bar according to claim 16 wherein the first section is configured as a handle section having a width narrower than the second width and narrower than a width of the first claw portion.

18. The pry bar according to claim 1 wherein the first section is configured as a handle section having a width narrower than a width of the first claw portion.

19. The pry bar according to claim 1 wherein the single pry panel is disposed centrally between the first lateral edge and the second lateral edge.

20. The pry bar according to claim 1 wherein a fulcrum ridge is formed where the first leg is connected to the second leg and wherein the fulcrum ridge is substantially perpendicular to the first lateral edge and the second lateral edge.

21. The pry bar according to claim 1 wherein the first leg forms a first angle relative to the second plane and the second leg forms a second angle relative to the second plane and wherein a ratio of the first angle to the second angle is around 1:2.

22. A pry bar comprising:

a first section having a longitudinal axis in a first plane;

a second section comprising a first claw portion;

a third section; and an elongated crest;

wherein the first claw portion comprises a first plate having first and second lateral edges disposed in a second plane substantially perpendicular to the first plane and a pry panel extending from the first plate toward the first section;

wherein the pry panel comprises a first leg and a second leg, each leg has a first end and a second end, wherein the first end of the first leg is connected to the first plate, wherein the second end of the second leg is connected to the first plate, and wherein the second end of the first leg is connected to the first end of the second leg;

wherein the third section comprises a chisel portion;

wherein the first section comprises a middle portion disposed between the chisel portion and the first claw portion, wherein the chisel portion is angled away from the first claw portion and forms an angle relative to the first plane of around 20-30 degrees; and wherein the elongated crest is disposed on at least a part of the middle portion and a part of the chisel portion.

23. The pry bar according to claim 22 wherein the chisel portion comprises a sharpened edge at a distal end and a notch in the distal end.

24. A pry bar comprising:

a first section having a longitudinal axis in a first plane;

a second section comprising a first claw portion;

wherein the first claw portion comprises a first plate having first and second lateral edges disposed in a second plane substantially perpendicular to the first plane and a pry panel extending from the first plate toward the first section;

wherein the pry panel comprises a first leg and a second leg, wherein each leg has a first end and a second end, wherein the first end of the first leg is connected to the first plate, wherein the second end of the second leg is connected to the first plate, and wherein the second end of the first leg is connected to the first end of the second leg;

wherein the second section further comprises a second claw portion disposed between the first section and the first claw portion and wherein the second claw portion comprises at least one ridge;

wherein the second section further comprises a rounded heel disposed between the first claw portion and the second claw portion; and wherein the first plate further comprises at least one indentation disposed between the pry panel and the rounded heel.

25. A pry bar comprising a single plate formed into sections, the sections comprising:

a first section having a longitudinal axis in a first plane;

a second section comprising a first claw portion;

wherein the first claw portion comprises a first lateral edge and a second lateral edge each disposed in a second plane substantially perpendicular to the first plane and consists of a single pry panel disposed between the first lateral edge and the second lateral edge and extending toward the first section; and wherein the single pry panel comprises a first leg and a second leg, wherein the first leg is longer than the second leg, wherein the first leg forms an angle relative to the second plane of around 20-25 degrees and the second leg forms an angle relative to the second plane of around 40-50 degrees.

26. The pry bar according to claim 25 wherein the second section further comprises a second claw portion disposed between the first section and the first claw portion wherein the second claw portion has a first width near the first section that is narrower than a second width near the first claw portion.

27. The pry bar according to claim 26 wherein the second section further comprises a rounded heel disposed between the first claw portion and the second claw portion.

* * * * *